United States Patent [19]

Harrison

[11] 4,038,966
[45] Aug. 2, 1977

[54] SOLAR HEAT COLLECTOR TANK

[75] Inventor: Henry Harrison, Locust Valley, N.Y.

[73] Assignee: Halm Instrument Co., Inc., Glen Head, N.Y.

[21] Appl. No.: 621,133

[22] Filed: Oct. 9, 1975

[51] Int. Cl.² .............................................. F24J 3/02
[52] U.S. Cl. .................................. 126/271; 165/105
[58] Field of Search ............. 126/270, 271; 165/105; 237/1 A

[56] References Cited

U.S. PATENT DOCUMENTS

| 2,460,482 | 2/1949 | Abbot | 126/271 |
| 3,145,707 | 8/1964 | Thomason | 126/271 |
| 3,250,269 | 5/1966 | Sherock | 126/271 |
| 3,369,540 | 2/1968 | Meckler | 126/271 |
| 3,799,144 | 3/1974 | Ramsey et al. | 126/276 |
| 3,918,430 | 11/1975 | Stout et al. | 126/271 |
| 3,923,038 | 12/1975 | Cutchaw | 126/271 |

FOREIGN PATENT DOCUMENTS 257,425 5/1963 Australia ............................ 126/271

Primary Examiner—Kenneth W. Sprague
Attorney, Agent, or Firm—James P. Malone

[57] ABSTRACT

A solar heat collector. A thin evacuated tank has upper and lower parallel sides, the upper side having a black exterior surface, the tank being mounted at an angle to the horizontal. A small amount of vaporizable fluid is contained in the tank. A fluid conduit is connected in heat exchanging relation with the upper end of the tank. Solar rays striking said upper tank surface will vaporize the fluid in the tank and the vapor will flow to the upper portion of the tank where it will be condensed and transfer its heat to fluid in the conduit.

5 Claims, 4 Drawing Figures

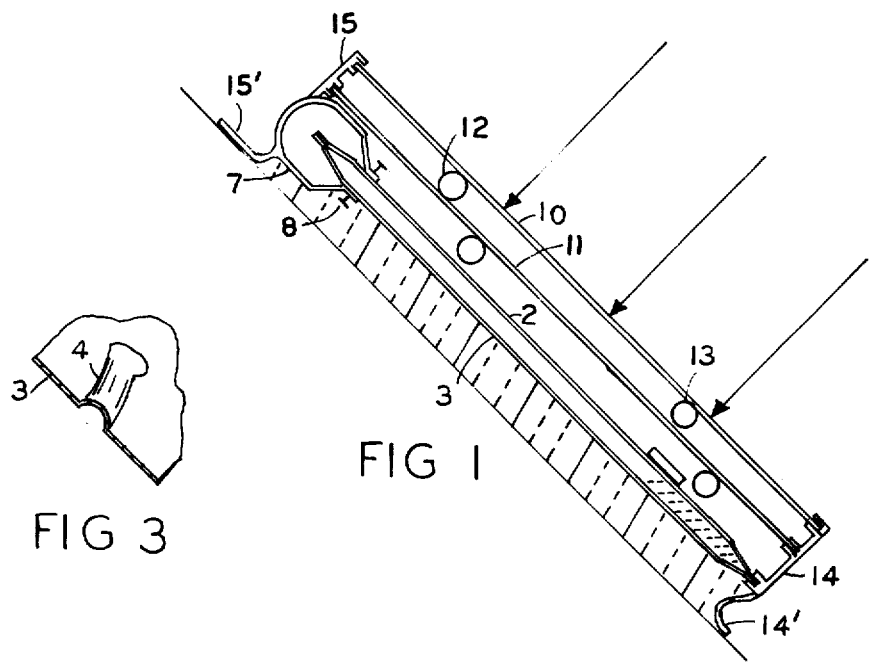
FIG 1
FIG 3
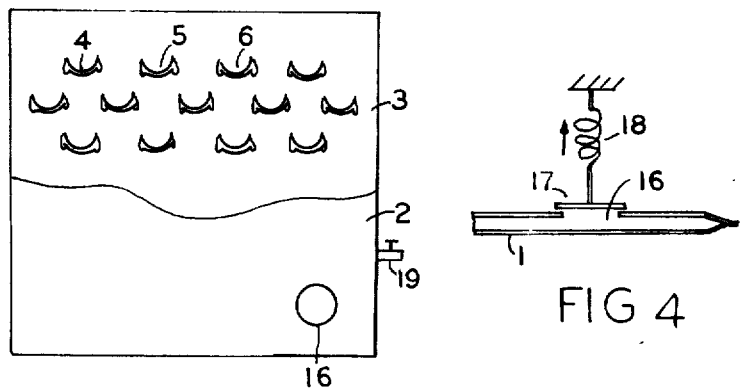
FIG 2
FIG 4

SOLAR HEAT COLLECTOR TANK

This invention relates to solar heat collectors and more particularly to a solar heat collector using a thin flat tank.

Conventional heat collectors generally comprise a black plate with water pipes connected thereto to convey the heat away from the collector.

The present collector utilizes a thin evacuated tank with a small amount of fluid therein. The tank is mounted at an angle to the horizontal, for instance, on a sloping roof. The upper exterior surface of the tank is black. Solar rays striking the upper surface will vaporize the fluid in the tank causing it to rise to the upper portion of the tank.

At the upper portion of the tank, a conduit is mounted in heat exchanging relation with the upper end of the tank, water or other transfer fluid is passed in the conduit in order to convey the heat to the tank collector and to utilization apparatus.

Accordingly, a principal object of the invention is to provide new and improved solar heat collector means.

Another object of the invention is to provide new and improved solar heat collector means using a thin flat tank containing a vaporizable fluid.

Another object of the invention is to provide new and improved solar heat collector means having a very fast heat response.

Another object of the invention is to provide new and improved solar heat collector means having a very fast heat response and high efficiency.

Another object of the invention is to provide new and improved solar heat collector means comprising a thin evacuated tank having upper and lower parallel sides, said upper side having a black exterior surface, said tank being mounted at an angle to the horizontal, a predetermined amount of vaporizable fluid in said tank, a fluid conduit connected in heat exchanging relation with the upper end of said tank, whereby solar rays striking said upper tank surface will vaporize said fluid in said tank and the vapor will rise to the upper portion of the tank where it will be condensed and transfer its heat to fluid in said conduit.

These and other objects of the invention will be apparent from the following specification and drawings of which:

FIG. 1 is a sectional side view of an embodiment of the invention.

FIG. 2 is a plan view of the interior of the surface of the lower side of the tank.

FIG. 3 is a partial detail view of FIG. 2.

FIG. 4 is a schematic detail view of the pressure relief vent.

Referring to the figures, the invention comprises a tank 1, having a thin flat configuration and having a depth of approximately one-sixteenth of an inch. The tank is adapted to be mounted at an angle to the horizontal, for instance, on a sloping roof. The upper side 2, of the tank is black on its exterior side, for instance it may be treated with zinc chromate black.

The lower side 3, of the tank has a plurality of spaced, raised, curved ridges, 4, 5, 6, etc., as shown in FIGS. 2 and 3.

At the upper end of the tank is mounted a conduit 7. The upper end of the tank extend into the conduit in heat exchange relation with fluid within the conduit. In operation, the fluid will be pumped in the conduit to convey heat away from the tank. The conduit may be clamped to the upper end of the tank by clamp 8.

In order to provide sufficient insulation on the front of the plate, two transparent covers 10 and 11, are mounted above the tank. The covers are mounted and spaced by spacing members 12, 13, etc., which may be equal sized stones which are cemented to the covers and the tank, for instance, by silicone rubber cement. The covers 10 and 11, are of transparent material which may be a clear plastic film. The covers may be sealed at the edges by means of extruded elastomer end pieces, 14 and 15. The piece 15 may be a part of the conduit connection. Nailing flanges 14', 15', suitable for securing the assembly to a roof may be provided as an integral part of the extrusions. The flexibility of the edge member allows them to conform to dimensional errors, thermal expansion wind pressure strains, and somewhat irregular mounting surfaces without overstressing the collector tank or the transparent covers. Its low heat conductivity reduces heat losses from the collector tank.

Below the tank, cemented to its exterior lower surface, is a thickness of fiber glass insulation 20. Suitably spaced from the lower edge of the upper side 2, is mounted a vent 16, also shown in FIG. 4. The vent 16 is used for inserting fluid into the tank and also as shown in FIG. 4, acts as a pressure relief device. The height of the vent above the lower edge can be used as a gauge for controlling the amount of water put into the tank.

Referring to FIG. 4, the vent 16, has a cover 17, which is connected to a tension spring 18. If the pressure in the tank exceeds atmospheric pressure, the pressure will force the cover 17 up, and the spring will lift it and hold it in open postion. The tank also may have a valve connection 19, FIG. 2, for applying vacuum to the tank. If vent 16 is accessible, however, for example, through a plug in the transparent cover, the tank can be filled with water and evacuated through vent 16.

In operation, a small amount of fluid is inserted in the tank, for instance, sufficient to fill the bottom fifth of the tank. The tank is then evacuated by a source of vacuum. Solar rays striking the upper surface of the tank will heat the tank very quickly and cause the tank fluid to vaporize. This vapor will rise to the upper portion of the tank where it will be condensed by the fluid in the conduit 7. The condensed fluid will then drip down along the lower interior surface of the tank and will be held in the various curved ridges, 4, 5, 6, etc. The purpose of the ridges is to distribute the tank liquid over the lower surface so that it can be easily and quickly vaporized. The present invention can be made in modular form so that two or more tanks can be connected to the conduit 7. The tank may be of any conventional dimensions, for instance, three to four feet square and it has a depth of only about one-sixteenth of an inch. Therefore, the tank has very rapid heating and cooling.

If the vacuum is lost for any reason, the vent will spring open indicating that the tank is not operating.

The invention has the following advantages.

1. One way heat flow prevents heat loss from the circulating heat transfer fluid.
2. Insensitive to freezing because the internal fluid is subdivided with free surfaces and the structure yields easily.
3. Can be, with suitable fluid of higher boiling point, insensitive to high temperature, but in any case is not destroyed by overheating.

4. Very fast response and increased efficiency on partially cloudy days.
5. Minimum material required.
6. Flexible panel, not breakable, adaptable for retrofit on existing buildings.
7. Vent indicates when vacuum is lost and is easy to refill.
8. Soft edge gasketing facilitates sealing panels together in modular form.

I claim:

1. A solar heat collector comprising, a thin evacuated tank having upper and lower parallel sides, said upper side having a black exterior surface, said tank being mounted at an angle to the horizontal, a predetermined amount of vaporizable fluid in said tank, a fluid conduit connected in heat exchanging relation with the upper end of said tank, whereby solar rays striking said upper tank surface will vaporize said fluid in said tank and the vapor will rise to the upper portion of the tank where it will be condensed and transfer its heat to fluid in said conduit.

2. Apparatus as in claim 1, having a transparent cover spaced over the surface of said tank.

3. Apparatus as in claim 1, wherein the interior surface of one side of said tank has spaced, raised, curved ridges to distribute the condensed fluid in said tank over said interior surface so that it may be quickly vaporized again by the solar heat.

4. Apparatus as in claim 1, having an automatic pressure relief vent in said tank.

5. Apparatus as in claim 2, having non-restraining members of pliable heat-insulating material on all edges whereby the spaces between the tank and cover members are closed against heat loss and contamination.

* * * * *